United States Patent
Chang et al.

(10) Patent No.: US 7,890,052 B2
(45) Date of Patent: *Feb. 15, 2011

(54) STRATOSPHERIC-BASED COMMUNICATION SYSTEM FOR MOBILE USERS USING ADDITIONAL PHASED ARRAY ELEMENTS FOR INTERFERENCE REJECTION

(75) Inventors: Donald C Chang, Thousand Oaks, CA (US); Alan Cha, Glendale, CA (US); Jacqueline C Chen, La Canada, CA (US); Frank A Hagen, Palos Verdes Estates, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 559 days.

This patent is subject to a terminal disclaimer.

(21) Appl. No.: 11/928,577

(22) Filed: Oct. 30, 2007

(65) Prior Publication Data
US 2008/0233884 A1 Sep. 25, 2008

Related U.S. Application Data

(63) Continuation of application No. 09/661,725, filed on Sep. 14, 2000, now Pat. No. 7,317,916.

(51) Int. Cl.
*H04M 1/00* (2006.01)
*H04B 7/216* (2006.01)
*H04B 1/38* (2006.01)
*H04B 7/19* (2006.01)
*H04B 7/185* (2006.01)
*H04W 4/00* (2009.01)
*H01Q 1/28* (2006.01)
*H01Q 9/00* (2006.01)
*H01Q 3/00* (2006.01)

(52) U.S. Cl. ............ 455/13.2; 455/562.1; 455/561; 455/430; 455/431; 455/429; 455/13.3; 343/705; 343/706; 343/751; 343/757; 343/777; 370/320; 370/335; 370/342

(58) Field of Classification Search ............ 455/562.1, 455/561, 430, 13.2, 431, 429, 13.3; 343/705, 343/706, 751, 757, 777; 370/320, 335, 342
See application file for complete search history.

(56) References Cited

U.S. PATENT DOCUMENTS

| 4,364,052 A | 12/1982 | Ohm |
| 5,218,619 A * | 6/1993 | Dent .................... 370/209 |

(Continued)

OTHER PUBLICATIONS

Notice of Allowance dated Dec. 30, 2009 in U.S. Appl. No. 09/661,967, filed Sep. 14, 2000 by Ying J. Feria et al.

(Continued)

*Primary Examiner*—Matthew D Anderson
*Assistant Examiner*—Bobbak Safaipour

(57) ABSTRACT

A communication system has a stratospheric platform with a payload controller and a phased array antenna having a plurality of main array elements for generating a plurality of communication beams and a plurality of auxiliary elements for canceling interference between the communication beams. A gateway station communicates with the stratospheric platform. The gateway station scales the plurality of elements to form a reconfigurable plurality of beams. The gateway station communicates an embedded control signal to the stratospheric platform to communicate a scaling of elements to form the communication beams and the auxiliary element output. The auxiliary element output is used to provide interference canceling.

24 Claims, 5 Drawing Sheets

U.S. PATENT DOCUMENTS

| | | | | |
|---|---|---|---|---|
| 5,361,074 | A | * | 11/1994 | Hansen ........................ 342/381 |
| 5,550,809 | A | * | 8/1996 | Bottomley et al. .......... 370/342 |
| 5,555,257 | A | * | 9/1996 | Dent ........................... 370/319 |
| 5,572,216 | A | * | 11/1996 | Weinberg et al. ....... 342/357.06 |
| 5,594,941 | A | * | 1/1997 | Dent ........................... 455/13.4 |
| 5,765,098 | A | | 6/1998 | Bella |
| 5,810,284 | A | * | 9/1998 | Hibbs et al. ................... 244/13 |
| 5,856,804 | A | * | 1/1999 | Turcotte et al. .............. 342/371 |
| 5,903,549 | A | * | 5/1999 | von der Embse et al. .... 370/310 |
| 5,909,460 | A | * | 6/1999 | Dent ........................... 375/130 |
| 5,949,766 | A | * | 9/1999 | Ibanez-Meier et al. ....... 370/316 |
| 6,151,308 | A | * | 11/2000 | Ibanez-Meier et al. ....... 370/316 |
| 6,157,685 | A | | 12/2000 | Tanaka et al. |
| 6,380,893 | B1 | * | 4/2002 | Chang et al. ................. 342/373 |
| 6,507,739 | B1 | * | 1/2003 | Gross et al. .................. 455/431 |
| 6,526,288 | B1 | * | 2/2003 | Khalifa et al. ................ 455/557 |
| 6,556,845 | B1 | * | 4/2003 | Ide et al. ................... 455/562.1 |
| 7,317,916 | B1 | * | 1/2008 | Chang et al. ................. 455/430 |
| 7,369,847 | B1 | | 5/2008 | Rosen et al. |
| 7,627,284 | B2 | * | 12/2009 | Wang ......................... 455/13.1 |
| 2001/0055320 | A1 | | 12/2001 | Pierzga et al. |

OTHER PUBLICATIONS

Non-final Office action dated Jan. 27, 2010 in U.S. Appl. No. 12/046,271, filed Mar. 11, 2008 by Harold Rosen et al.

Notice of Allowance dated May 17, 2010 in U.S. Appl. No. 09/858,989 filed May 15, 2001 by Donald C.D. Chang et al.

Non-final Office action dated Jul. 21, 2010 in U.S. Appl. No. 12/046,271, filed Mar. 11, 2008 by Harold A. Rosen et al.

* cited by examiner

STRATOSPHERIC-BASED COMMUNICATION SYSTEM FOR MOBILE USERS USING ADDITIONAL PHASED ARRAY ELEMENTS FOR INTERFERENCE REJECTION

RELATED APPLICATION

The present disclosure is a Continuation of U.S. patent application Ser. No. 09/661,725 filed on Sep. 14, 2000 now U.S. Pat. No. 7,317,916, the disclosure of which is incorporated by reference herein.

TECHNICAL FIELD

The present disclosure relates generally to a platform based communication system and more particularly, to a communication system using a stratospheric platform and a gateway station that forms the multiple beams on the ground using interference canceling by controlling interference using additional antenna elements.

BACKGROUND

In this communication age, content providers are increasingly investigating ways in which to provide more content to users as well as interfacing with users.

Communication satellites have become commonplace for use in many types of communication services, e.g., data transfer, voice communications, television spot beam coverage, and other data transfer applications. As such, "bent pipe" satellites transmit and receive large amounts of signals used or "multiple spot beam" configuration to transmit signals to desired geographic locations on the earth. Mobile applications such as telephones and personal digital applications are becoming increasingly popular.

All of these current mobile satellite communication systems, however, suffer from a variety of disadvantages. First, they all have limited frequency resources. Any given frequency over a given ground position can only be utilized by one user with mobile handset at a time. This is true regardless of the sophistication of the system, including systems that utilize multiple beam satellite designs. Even when multiple satellites are available at a given geographic location, the same frequency spectrum cannot be used by more than one nearby mobile handset user. The availability of multiple satellites merely serves to increase the availability of the system to that mobile handset user who is assigned the specific frequency spectrum. However, the total capacity of these mobile communication satellite systems is still limited by the inefficient usage of the frequency spectrum. Thus, the potential growth of these current satellite communication systems is inherently limited.

Additionally, current telecommunications systems only allow mobile-to-hub and hub-to-mobile communications in most of the low earth orbit and medium earth orbit mobile satellite constellations. Mobile-to-mobile linkages require multiple hops between hubs. Thus, one user with a mobile handset utilizes a satellite at a frequency slot to communicate to his counterpart on the network. Other satellites on or in the same region cannot reuse the same frequency slot for other nearby handset users. Thus, if a secondary user nearby has a handset that requires a particular frequency, which is being utilized by the first user nearby, the second user is unable to access the system through the same frequency via different satellites.

As described in U.S. Pat. No. 5,903,549, satellites may use a phased array antenna to communicate with users on the ground. The phased array antenna is comprised of a plurality of elements that are used to form a beam. The beam forming is implemented by adjusting the amplitude and phase of each signal path routed to each feed element. Each individual signal path is routed to multiple feeds with relative amplitudes and phases, which define each intended beam. In the '549 patent, the beam forming has been removed from the satellite and is performed on the ground. This reduces the complexity of the payload of the satellite.

Implementing a mobile communication system using a satellite is relatively expensive due to the typical complexity of the satellite payload and the expense of launch. The satellites also use a relatively low gain antenna, which is sometimes inadequate for third generation (3-G) cellular type systems. Because of the complexity, the satellites cannot be deployed quickly and thus, from a business standpoint, market share may be lost. Also, as new technology develops, the satellite must be replaced which is also very expensive.

Limitations to the number of users may be inhibited by interference in systems. That is, for every beam having a main lobe, a parasitic number of side lobes exist which may cause interference with beams using the same system resource such as frequency.

SUMMARY

The present disclosure provides a mobile communication system that allows rapid deployment and provides interference rejection. The system is implemented in a stratospheric platform based mobile communication system.

In one aspect of the disclosure, a communication system includes a stratospheric platform having a payload controller and a phased array antenna having a plurality of main array antenna elements for generating a plurality of communication beams and a plurality of auxiliary elements for canceling interference from side lobes of the plurality of the communication beams. The system further includes a gateway station in communication with the stratospheric platform. The gateway station scales user signals to form a plurality of main array element control signals and auxiliary element control signals. The gateway station communicates the main array element control signals and the auxiliary element control signals to the stratospheric platform. The stratospheric platform forms the communication beams and the auxiliary element output to reduce interference from side lobes of the communication beams from the main array element control signals and the auxiliary element control signals.

In a further aspect of the disclosure, a method of controlling a communication system having a stratospheric platform with a phased array antenna having a plurality of elements, main array elements and a plurality of auxiliary elements includes scaling a plurality of user signals to form a plurality of main array element control signals and a plurality of auxiliary element control signals in a gateway station, communicating the main array element control signals and the plurality of auxiliary element control signals to a stratospheric platform, generating the communication beams in response to the scaling the plurality of user signals, generating the auxiliary element outputs in response to the auxiliary element control signals at stratospheric platform and reducing side lobe interference from side lobes communication beams in response to the auxiliary element outputs.

One advantage of the invention is that due to the interference detection, system throughput is increased over conventional systems.

Another advantage of the invention is that the payload weight and power consumption are significantly reduced without impacting system performance. The whole beam forming and traffic switching or routing mechanisms, normally on board the platform, have been moved to the ground, taking advantage of the unique "spoke and hub" communications traffic topology. The payload only requires a small number of array elements to provide interference canceling.

Other features and advantages of the present invention using digital beam forming on ground are readily apparent from the following detailed description of the best mode for carrying out the invention when taken in connection with the accompanying drawings.

DETAILED DESCRIPTION

Figure 1:
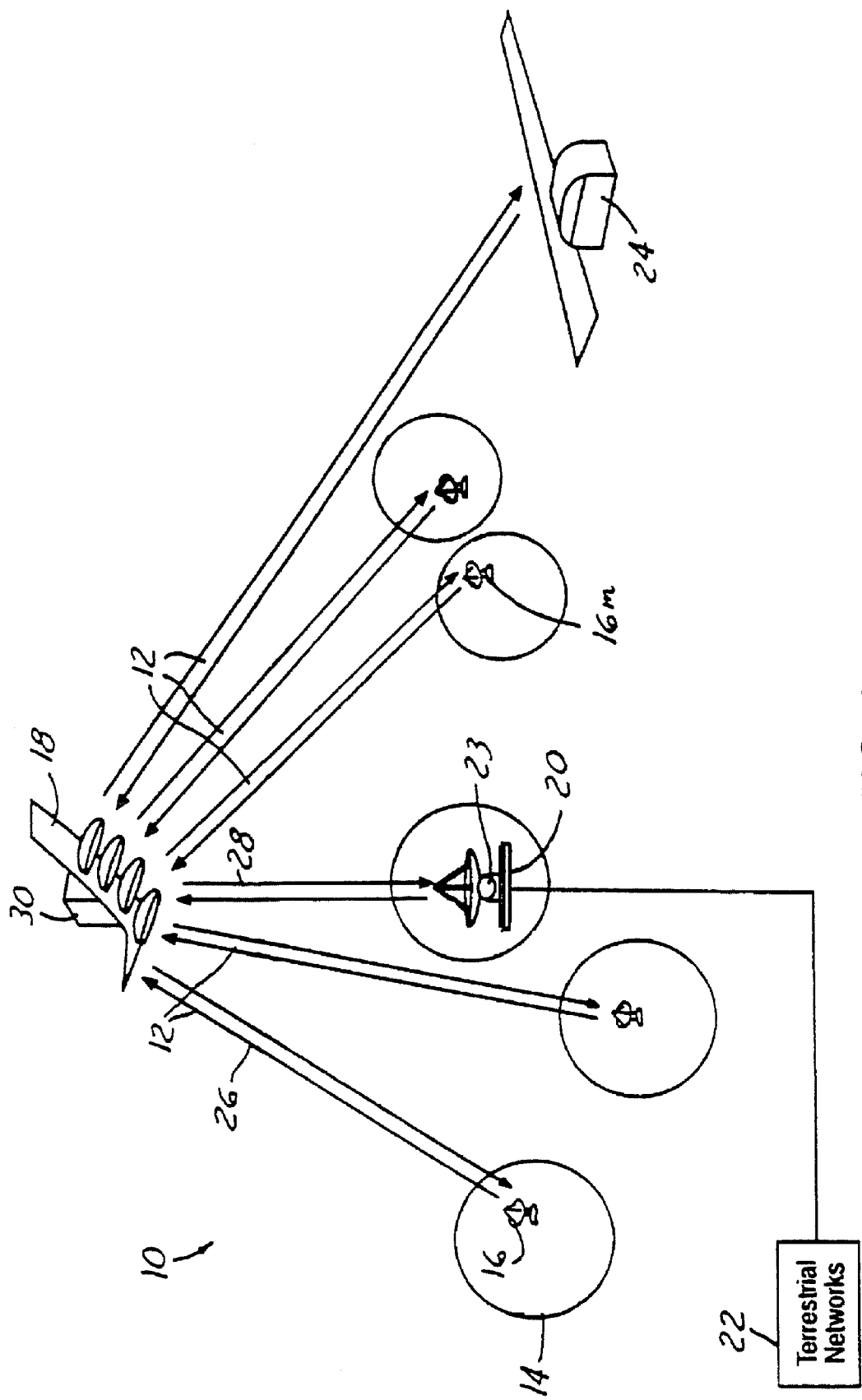
FIG. 1 is a system diagram of a communication system according to the present disclosure.

In the following description, the same reference numerals are used to identify the same components in the various views. Those skilled in the art will recognize that various other embodiments, structural changes and changes in measures may be made without departing from the scope of the disclosure.

Referring now to FIG. 1, a communications system 10 has a plurality of beams 12 that are illustrated as a plurality of circles 14 on the earth's surface. Circles 14 represent the footprint of a radiated beam onto the earth's surface. A plurality of user terminals 16M and 16F are used to illustrate mobile users and fixed users, respectively. Mobile users 16M may comprise but are not limited to automotive applications, personal digital assistant applications and cellular phone applications. Fixed user terminals 16F may, for example, comprise business-based or consumer-based communication systems. Each user terminal 16F and 16M may receive a signal with the predetermined signal strength from a spot beam pattern that is radiated from stratospheric platform 18. The present disclosure is particularly advantageous for use with mobile terminals 16M.

Communication system 10 further includes a gateway station 20 that is coupled to terrestrial networks 22. Communication system may also include a platform operations center 24. Both gateway station 20 and platform operations center 24 are in communication with stratospheric platform 18. Gateway station 20 provides a link between user terminals 16F, 16M and terrestrial networks 22 through stratospheric platforms 18. Platform operation center 24 provides command and control functions to communications platform 18.

Although illustrated as two separate units, gateway station 20 and platform operation center 24 may be combined into the same physical location.

The communication signals between stratospheric platform 18 and user terminals 16M and 16F may be referred to as user links 26. User links 26 represent the transmit and receive beams from both categories of user terminals 16F, 16M and high altitude communications platform 18. A feeder link 28 is defined between high altitude communications platform 18 and gateway station 20.

High altitude communications platform 18 is preferably a stratosphere-based platform such as those under development by AeroVironment. Helios is one such project being developed by AeroVironment and is an unmanned vehicle that can fly for several months at an altitude of over 60,000 feet above the earth. Helios is a solar-powered, electric plane that is modular in design and may be configured in a variety of ways. The stratospheric platform is operated through the platform operations center 24 to fly in a small radius flight path over a given spot on the earth. As far as users are concerned, the platform is geo-stationary. In addition to a plane-like platform, the stratospheric platform may comprise a balloon or blimp-like platforms.

Stratospheric platform 18 is used as a communication node for gateway station 20 and user terminals 16F and 16M, each of which have an antennas that are pointed in the direction of the high altitude communications platform 18. As will be described below, the pointing from mobile terminals 16M may be performed electronically. Although only one gateway station 20 is illustrated in the figure, those skilled in the art would recognize that various numbers of gateway stations may be employed. As would be further described below, gateway station 20 has a high gain antenna that has a narrow beam width. The antenna may need a tracking mechanism with tracking speed adequate enough to maintain a communication link with the platform 18 throughout the flight path. Gateway station 20 may be coupled to terrestrial networks 22 such as the public service telephone network, the Internet, or an intranet. Gateway station 20 has communications processing facility 23 that controls the communication with the high altitude communications platform 18.

High altitude communication platform 18 has a payload 30 that links with user terminal 16M, 16F through the use of a phased array antenna and gateway station 20 with a feeder link antenna (preferably a parabolic dish) described below. In the present example, the payload 30 is used to generate a plurality of user beams configured according to the signals as determined in the gateway station 20.

Figure 2:
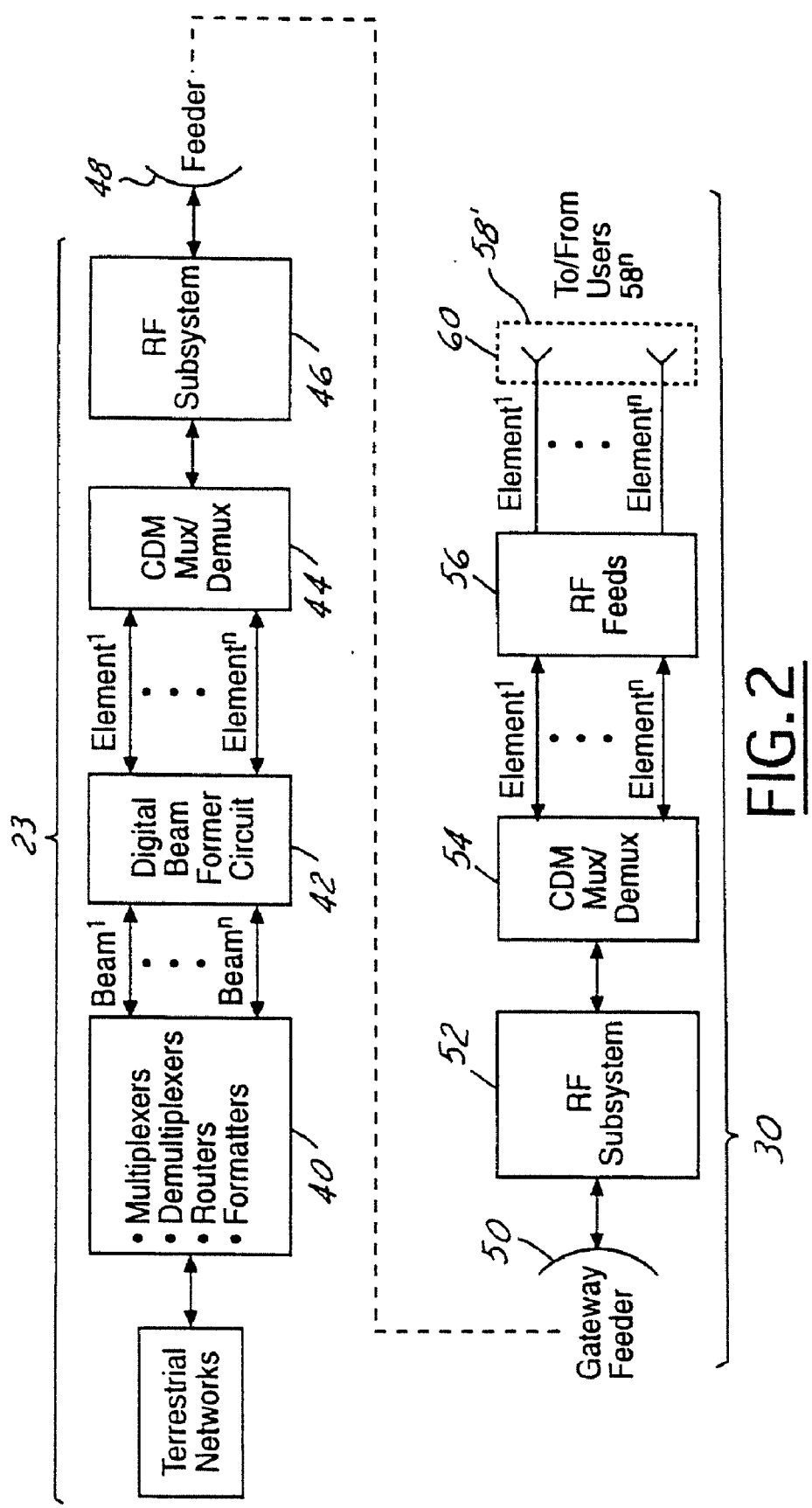
FIG. 2 is a high-level block diagrammatic view of the gateway station and payload platform according to the present invention having a digital beam forming circuit according to the present disclosure.

Referring now to FIG. 2, a block diagrammatic view of ground processing facility 23 and payload 30 are illustrated. Ground processing facility 23 has an interface electronics 40 that may represent a plurality of different circuits. For example, interface electronics 40 may comprise multiplexers, demultiplexers, routers and formatters. The interface electronics 40 may receive signals from the terrestrial networks 22 or may route various signals from different downlink beams from the platform 18 to the corresponding uplink bins. The "content" of all the uplink beams is placed into these buffers in the interface electronics 40. As illustrated, the signals of beam1 through beamn represent the buffered "content" that generated by interface electronics 40 and will be sent next to digital beam former circuit 42. The buffered signals are coupled to digital beam former circuit 42. Digital beam former circuit 42 generates main element control signals and auxiliary element control signals that are ultimately used to control the phase of the main array elements and auxiliary elements of the platform 18. Digital beam former circuit 42 "scales" all user signals by (1) dividing each user signal into a number of paths to form user signal components, each component corresponding to one element, (2) multiplying each user signal component according to the signal direction by amplitude and phase weighting, and (3) adding various user components together element by element, and (4) putting the component sum to corresponding element bins to form element signals. As a result, the user direction information has been embedded in the way the overall signal set is organized, not by separated direction control signals. As will be further described below in FIG. 4, the digital beam former circuit 42 may include the control of additional phased array elements to provide interference canceling.

The digital beam former circuit 42 forms a plurality of element control signals of element1 through elementn. The element control signals are coupled to code division multiplexers/demultiplexer 44. The bundled element control signals are then provided to an RF subsystem 46 that is used to transmit the aggregated signals through feeder antenna 48 to the high altitude communication platform 18. The platform 18 has a feeder link antenna 50 used to receive the aggregated element-signals from the gateway station 20. The feeder link antenna 50 is coupled to an RF subsystem 52 that processes the received signals in a conventional manner, including amplification, filtering and frequency down conversion. The RF subsystem 52 is coupled to code division multiplexer/demultiplexer 54 that separates the aggregated signals to individual element signals; the signals of element1 to that of elementn. The demultiplexer 54 has regenerated all the element signals developed by digital beam former circuit 42 on ground as discussed above. The regenerated element signals are sent to RF feeds 56, that provide the signals to the radiating aperture 58 of the phased array antenna 60. There are no phase shifters in the array. The element phasings for each beam are implemented in the digital beam former on ground and are embedded in the signal overall structure. All user signals will be transmitted simultaneously through the aperture. Thus, a user (user A) signal radiated from various elements will ultimately be added coherently in the designated direction (say, direction A) in far field, while other user signals designated for other directions will be added randomly in direction A. Similarly, in the far field along direction B, signals designated for other users at the same frequency band but designated for different directions will be added non-coherently.

Those skilled in the art would recognize that the ground processing facility 23 and payload 30 are also used for receiving signals from the users. Such systems operate in a reverse manner from that described above and therefore is not repeated.

Figure 3:
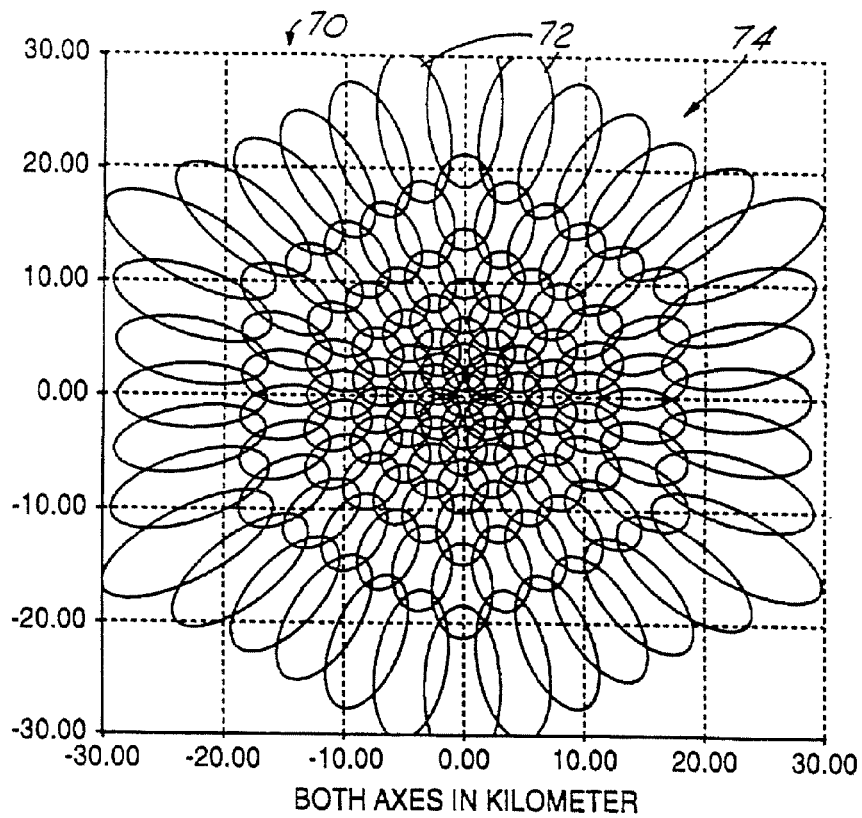
FIG. 3 is a plot of cell coverage according to the present disclosure.

Referring now to FIG. 3, a cell pattern 70 has a plurality of beams 72 that are generated by the stratospheric platform. As illustrated, a hexagon is generally formed to define a service area 74.

Figure 4:
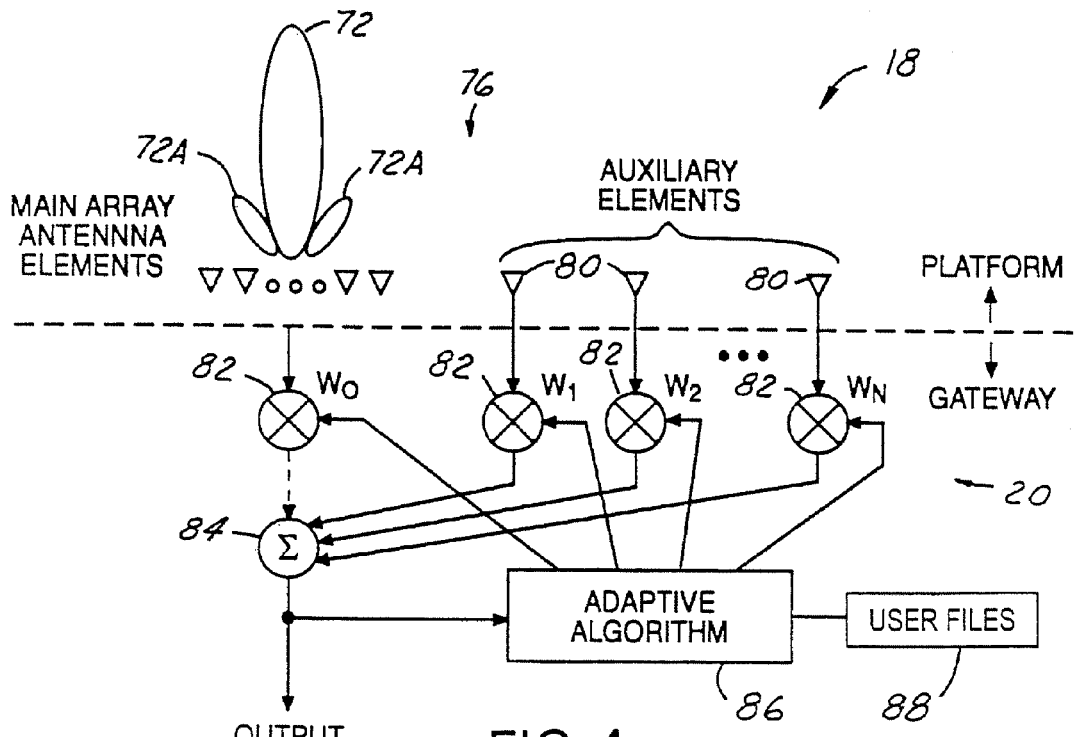
FIG. 4 is a diagrammatic view of the digital beam forming circuit for controlling addition elements according to the present disclosure.

Referring now to FIG. 4, the high altitude communication platform 18 is generally illustrated having a phased array antenna 76 having a plurality of main array antenna elements 78 that are used to form the coverage pattern of FIG. 3. Although only one beam 72 is illustrated having side lobes 72A, each beam is shaped similarly. Gateway station 20 uses ground beam forming to form the beams using main array elements 78 as described above. In addition, phase array antenna 76 has a plurality of auxiliary elements 80. As will be described below, auxiliary elements 80 are used for interference canceling. In one constructed embodiment, ninety-six main array elements 78 and five auxiliary elements 80 are used. That is, the ninety-one elements are configured to form the 127 antenna beams of FIG. 3. By using a controlled side lobe level, the ninety-one element array is designed for a −20 dB relative side lobe level using a 10 dB aperture illumination taper. The −20 dB relative side lobe level allows many users and different styles to use the same CDMA code address with acceptable interference level based on link analysis. Throughput is increased with the use of the five auxiliary elements 80 that act as side lobe cancellers. The present disclosure is particularly suitable for situations in which the user is aligned with the peak of the side lobe level. In such a situation, the present disclosure is applied and the five elements may be used to provide effective enhancement of interference rejection to a large number of simultaneous beams.

Gateway station 20 has multiplication blocks 82 that are used to assign a weight to the auxiliary elements 80 as well as main array elements 78. The weights of the auxiliary elements 80 are summed in the summing block 84. The weights of multiplication blocks 82 may be determined using an adaptive algorithm 86. The adaptive algorithm 86 may, for example, be coupled to user files 88 that includes the direction of strong interfering sources for each active beam from user positions.

Figure 5A:
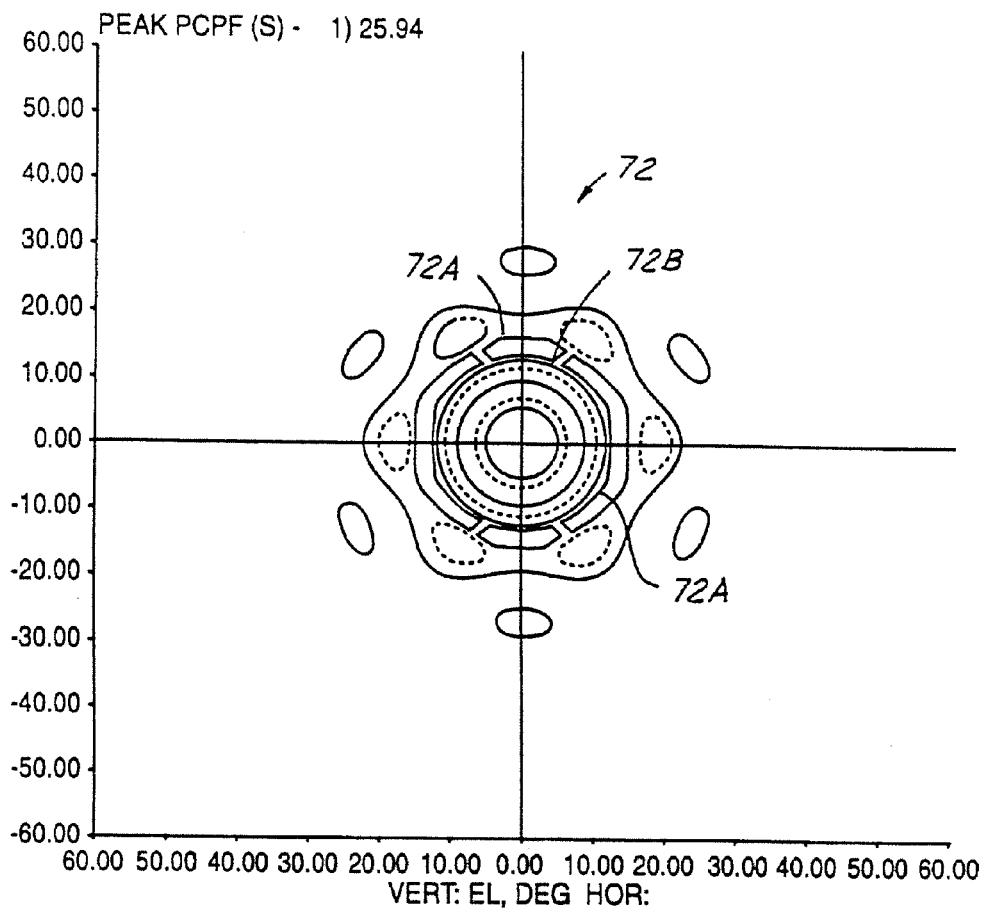
FIGS. 5A and 5B are a respective topological gain plot of a zero degree beam formed according to the present disclosure.
Figure 5B:
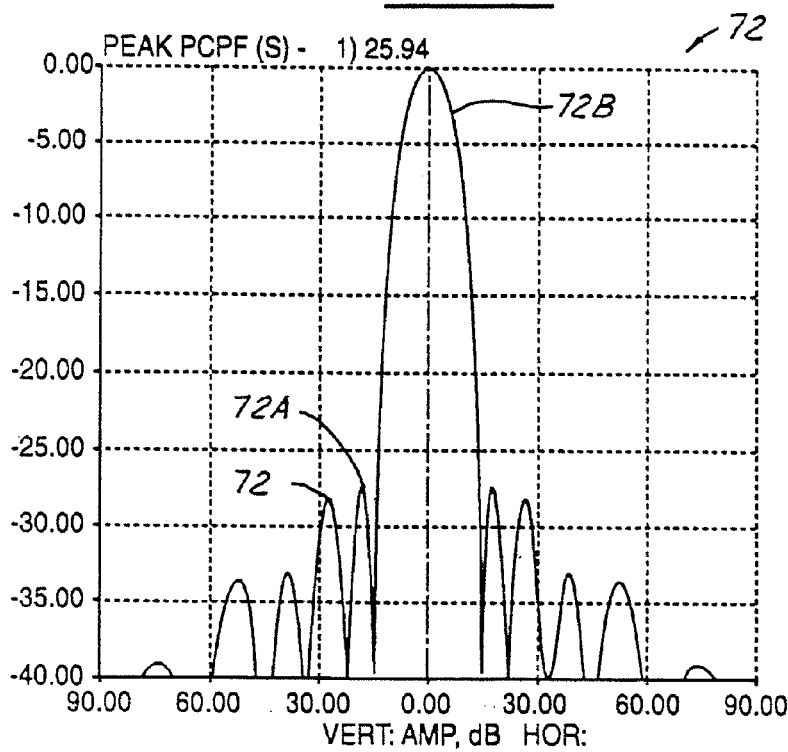

Referring now to FIGS. 5A and 5B, a beam 72 having a mainlobe 72B and side lobes 72A are illustrated. For this beam, the side lobe level is less than −20 dB relative to the peak of the mainlobe. In most circumstances, the side lobe performance would be satisfactorily to support user services under normal circumstances based on a link budget.

Figure 6A:
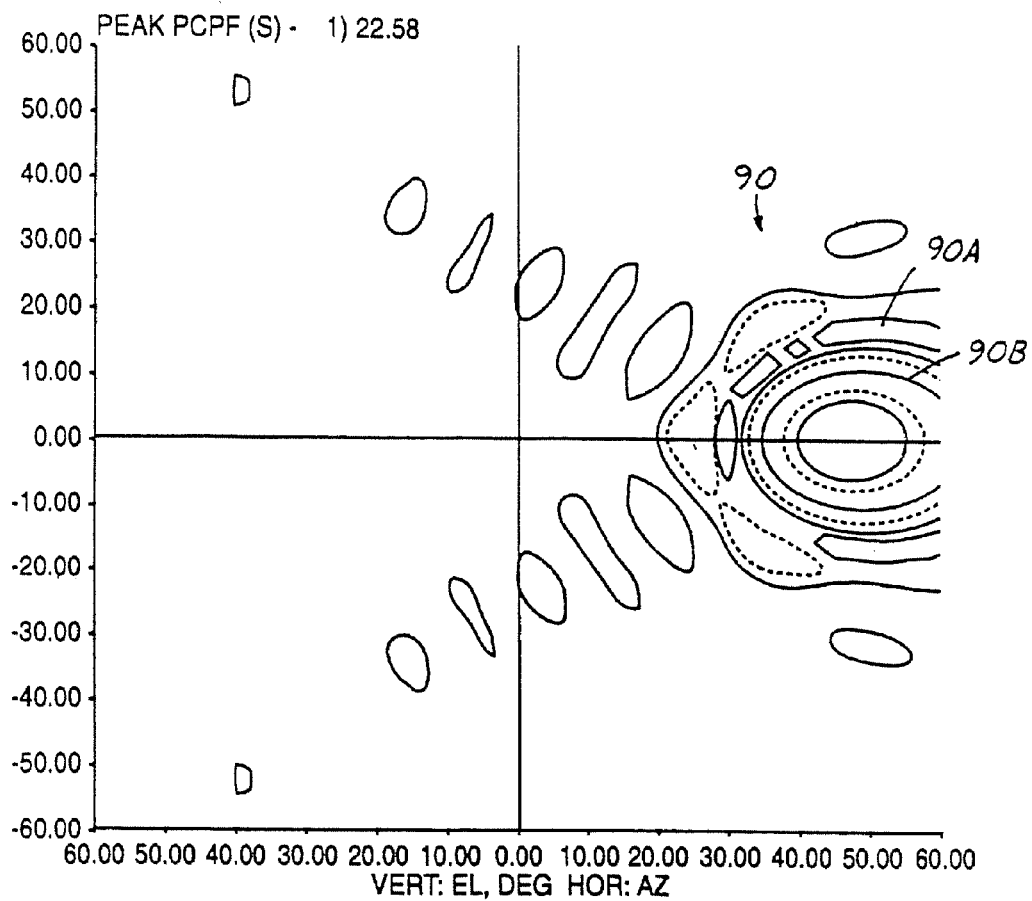
FIGS. 6A and 6B are a respective topological plot and gain plot of a fifty degree beam formed according to the present disclosure.
Figure 6B:
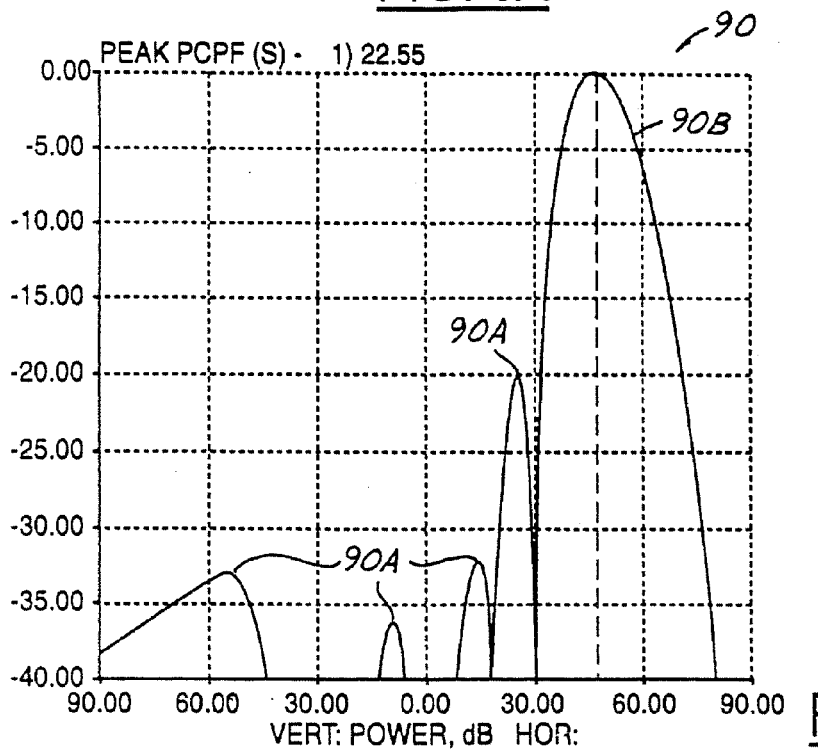

Referring now to FIGS. 6A and 6B, a beam 90 having side lobes 90A and mainlobe 90B is illustrated. In this example, the peak of the side lobe 90A is only 20 dB below the peak of the mainlobe 90B. Therefore, interference is more likely with such a configuration.

In operation, main array antenna elements 78 are used to generate the communication beams of the present disclosure. The auxiliary elements 80 are used to cancel interference from the main array antenna elements as needed. That is, by using user files 88 that have the positions of users stored therein, weights may be determined for auxiliary elements 80 so that the auxiliary elements 80 will have an auxiliary element output to cancel interference from the communication beams because the direction of strong interfering sources for each active beam may be determined from user position in the gateway station 20. Weights for the side lobe canceling element outputs are determined in the gateway station and the outputs are combined with the output of the communication beams. That is, the side lobes of the communication beams are selectively cancelled by the auxiliary element output. The side lobes are canceled by the auxiliary element output by generating a signal mathematically formed to provide canceling.

Advantageously, by providing the digital beam forming in the gateway station, all of the beams are formed in a real time manner using the user position files. As the system needs change, the gateway station may adaptively change the output of the auxiliary elements on a continual basis. Also, the digital beam former circuit may include adaptive algorithm 86 and be coupled to user files 88 shown in FIG. 4.

While the best modes for carrying out the disclosure have been described in detail, those familiar with the art to which this disclosure relates will recognize various alternative designs and embodiments for practicing the disclosure as defined by the following claims.

What is claimed is:

1. A communications system comprising:
   stratospheric platform having a payload controller and a phased array antenna having a plurality of main array antenna elements for generating a plurality of communication beams and a plurality of auxiliary elements for canceling interference from side lobes of the plurality of the communication beams;

a gateway station in communication with said stratospheric platform, said gateway station scaling user signals to form a plurality of main array element control signals and auxiliary element control signals, said gateway station communicating the main array element control signals and the auxiliary element control signals to the stratospheric platform;

said stratospheric platform forming the communication beams and the auxiliary element output to reduce interference from side lobes of the communication beams from the main array element control signals and the auxiliary element control signals.

2. A communications system as recited in claim 1, wherein the payload controller comprises a demultiplexer for receiving the main element and auxiliary element control signals.

3. A communications system as recited in claim 2, wherein the demultiplexer generates a plurality of regenerated element control signals.

4. A system as recited in claim 3, wherein the regenerated element control signals are coupled to an RF feed, the RF feed is coupled to elements of said phased array antenna.

5. A system as recited in claim 1, wherein said auxiliary element output is a function of a direction of the plurality of the communication beams.

6. A system as recited in claim 1, wherein the gateway station comprises a plurality of multiplication gates each having a respective weight, said auxiliary element output being a function of said weight.

7. A system as recited in claim 1, wherein the gateway station scales the user signals by: dividing each of the user signals into a number of paths corresponding to one of the plurality of main array elements to form user signal components, multiplying each user signal components by an amplitude and phase weighting and adding the user components together element by element to form component sums and placing the component sums into corresponding element bins to form the main array element control signals.

8. A system as recited in claim 1, wherein said gateway station further comprises a multiplexer multiplexing the element signals.

9. A system as recited in claim 8, wherein said multiplexer comprises a code division multiplexer.

10. A system as recited in claim 1, wherein said ground station is coupled to a terrestrial network.

11. A system as recited in claim 10, wherein said terrestrial network comprises the Internet.

12. A system as recited in claim 10, wherein the terrestrial network comprises the public service telephone network.

13. A system as recited in claim 1, wherein phased array antenna does not include phase shifters.

14. A system as recited in claim 1, wherein phasings for each of the communication beams are embedded in the main array element control signals.

15. A system as recited in claim 1, wherein the main array element control signals are added together to form the communication beams.

16. A method of controlling a communications system having a stratospheric platform with a phased array antenna having a plurality of main array elements and a plurality of auxiliary elements, said method comprising:

scaling a plurality of user signals to form a plurality of main array element control signals and a plurality of auxiliary element control signals in a gateway station;

communicating the main array element control signals and the plurality of auxiliary element control signals to a stratospheric platform;

generating communication beams in response to scaling the plurality of user signals;

generating auxiliary element outputs in response to the auxiliary element control signals at stratospheric platform; and reducing side lobe interference from side lobes communication beams in response to the auxiliary element outputs.

17. A method as recited in claim 16, wherein said step of generating the auxiliary element outputs comprises weighting the auxiliary element control signals.

18. A method as recited in claim 16, wherein the stratospheric platform comprises a payload controller having a demultiplexer, said method further comprising receiving the main element and auxiliary element control signals at the demultiplexer of the stratospheric platform and generating a plurality of regenerated element control signals at the demultiplexer and coupling the regenerated signals to an RF feed in communication with said phased array antenna.

19. A method as recited in claim 16, wherein generating the auxiliary element outputs comprises generating the auxiliary element output as a function of a direction of the plurality of the communication beams.

20. A method as recited in claim 16, wherein generating the auxiliary element outputs comprises generating the auxiliary element output as a function of a respective weight of a multiplication gate of the gateway station.

21. A method as recited in claim 16, wherein scaling a plurality of user signals comprises dividing each of the user signals into a number of paths corresponding to one of the plurality of main array elements to form user signal components, multiplying each user signal components by an amplitude and phase weighting and adding the user components together element by element to form component sums and placing the component sums into corresponding element bins to form the main array element control signals.

22. A method as recited in claim 16, wherein phased array antenna does not include phase shifters.

23. A method as recited in claim 16, further comprising embedding phasings for each of the communication beams in the main array element control signals.

24. A method as recited in claim 16, further comprising adding the main array element control signals together to form the communication beams.

* * * * *